A. S. SAMUELS.
FLUID PRESSURE WEIGHING MECHANISM.
APPLICATION FILED OCT. 27, 1920.
1,402,661.
Patented Jan. 3, 1922.
2 SHEETS—SHEET 1.
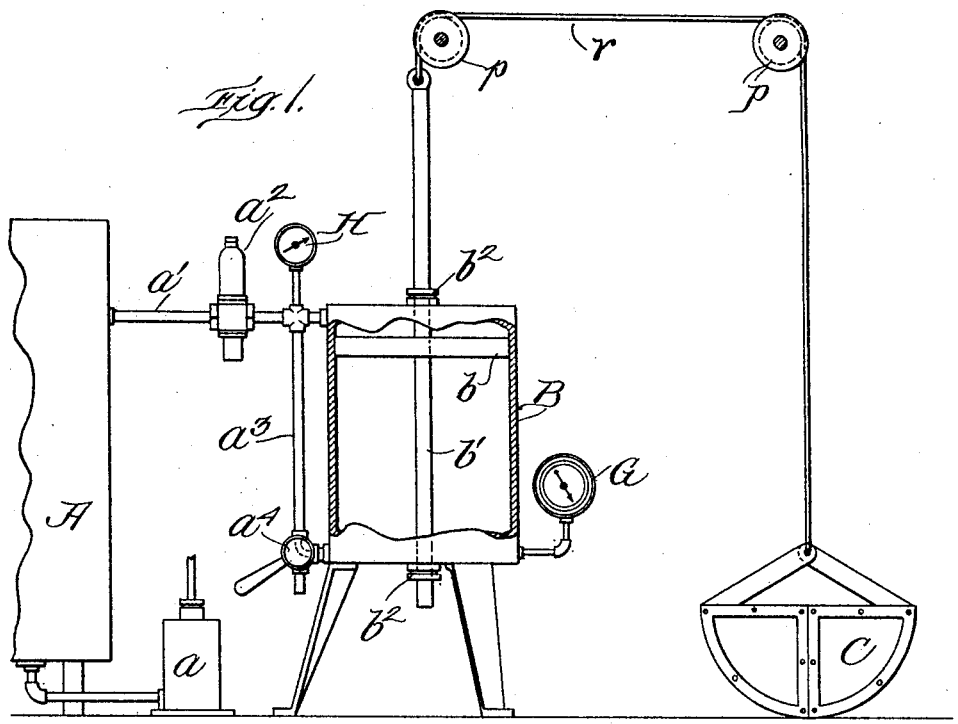
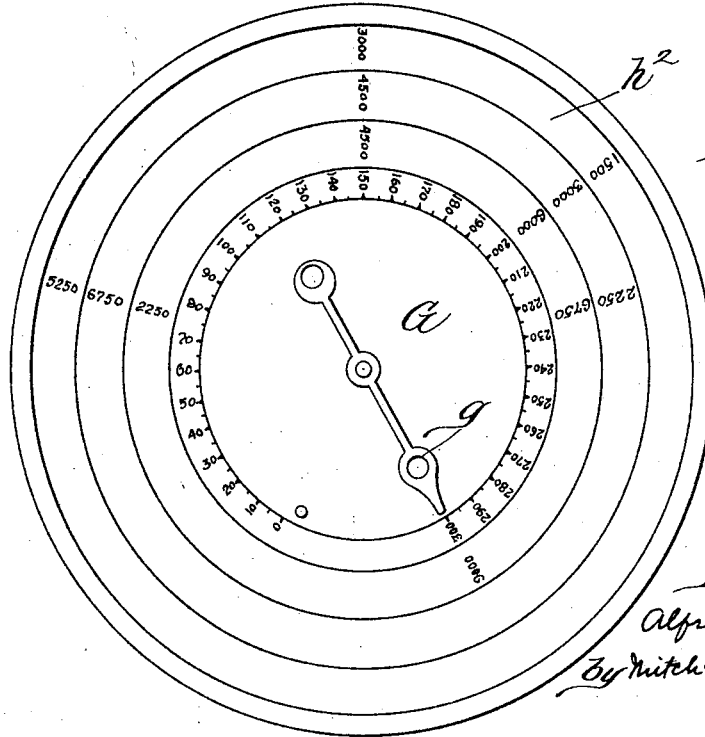
Inventor:
Alfred S. Samuels
By Mitchell, Chadwick & Kent,
Attys.

UNITED STATES PATENT OFFICE.

ALFRED S. SAMUELS, OF CLIFTONDALE, MASSACHUSETTS.

FLUID-PRESSURE WEIGHING MECHANISM.

1,402,661.           Specification of Letters Patent.      Patented Jan. 3, 1922.

Application filed October 27, 1920. Serial No. 419,821.

*To all whom it may concern:*

Be it known that I, ALFRED S. SAMUELS, a citizen of the United States, residing at Cliftondale, in the county of Essex and State of Massachusetts, have invented certain new and useful Improvements in Fluid-Pressure Weighing Mechanisms, of which the following is a specification.

My invention is a weighing mechanism, particularly applicable to the weighing of relatively large weights, and particularly to the weighing of such weights upon lighters, barges and the like, where the platform upon which a weighing apparatus must rest, is not fixed, but may be in motion during the operation. It is difficult in such cases to make a weight determination by means of any of the ordinary lever balance mechanisms in which a relatively great weight is balanced by a relatively small weight, through favorable leverages and in which, upon the other hand, a slight movement of the load may be transformed into violent movement of the smaller balancing weight.

I shall explain my new mechanism first by a simple diagrammatic illustration of the preferred form of my apparatus, the description assuming certain factors and I shall then describe my preferred apparatus as it is applied to a lighter designed to unload coal, ore or the like from a barge to a ship. It is obvious however that the subject matter upon which the mechanism operates is not in any sense of the essence.

In the drawings:

Figure 1 is a diagrammatic sketch, partly in section, of the various elements of which the preferred form of my apparatus is made up, showing conventionally their relations, as a basis for a description of the principles of operation;

Figure 2 is a sketch of an indicator face, showing by the position of the hand certain desired information;

Figure 3 is an elevation of the mechanism applied to the ordinary derrick and bucket mechainsm which may be mounted upon a lighter or the like.

Figure 3:
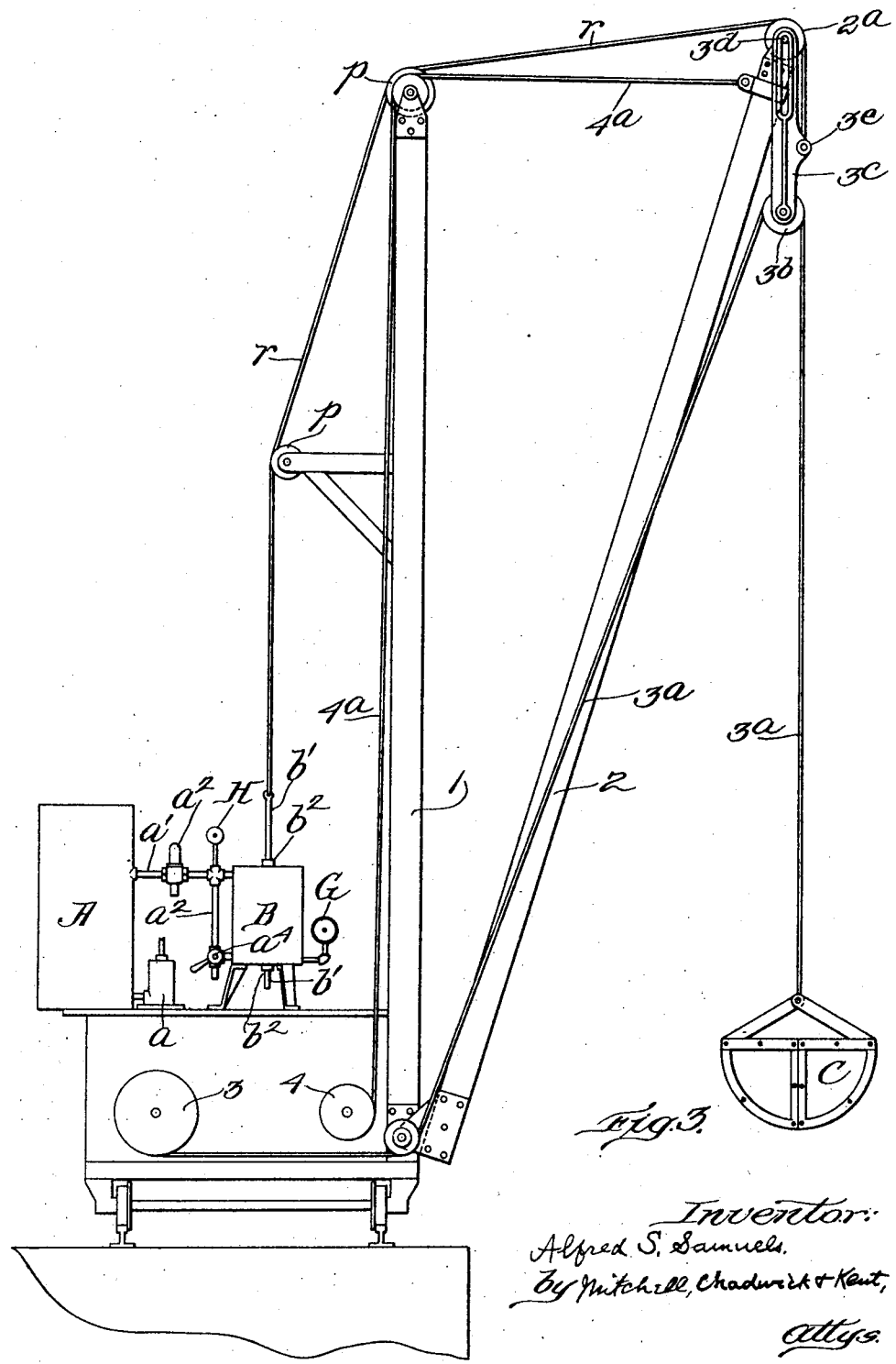

A high-pressure air tank is indicated at A, filled and constantly kept at a predetermined pressure by a suitable air pump, $a$. I shall assume, for the purpose of this description, that the pressure is maintained at 500 lbs. to the square inch. This tank is connected through a pipe, $a^1$, in which is located a reduction valve, $a^2$, with a cylinder, B, the pipe $a^1$ entering the cylinder at its upper end. A branch pipe, $a^3$, passes from between the reduction valve and the cylinder to the lower end of the cylinder, a two-way valve, $a^4$, being located in the branch pipe. The cylinder B is fitted with a piston $b$ and a piston rod $b^1$, which passes through suitable stuffing boxes $b^2$, in both ends of the piston. To the upper end of the piston rod is secured a rope $r$, passing over pulleys, $p$, to a bucket C, designed to carry the material to be weighed. A pressure gauge is indicated at G connected to the lower end of the cylinder below the piston. A second gauge H may be connected with the upper end of the cylinder, above the piston.

For the purpose of this description I have assumed a pressure in the air tank, A, of 500 lbs. to the square inch, which is reduced by the reduction valve, $a^2$, to 300 lbs. to the square inch, in the cylinder B. I further assume a piston of 30 square inches area, upon both sides of which there is normally 300 lbs. pressure per square inch, equal to a balanced pressure of 9000 lbs. The bucket C and connections is assumed at 1500 lbs. tare and the normal load capacity for coal or the like at 1500 lbs.

It will be obvious that with 300 lbs. below the piston, the gauge G will register 300 lbs. and as this pressure is the maximum, the gauge may be adjusted and calibrated on this basis, as indicated by the hand on the drawing, Figure 2.

By means of the two-way valve $a^4$, it is obvious that connection with the pipe $a^1$ may be cut-off and a vent to the atmosphere opened, the effect of which will be to break the balanced pressure by allowing the escape of some of the compressed air in the lower end of the cylinder with the result that the piston $b$ will descend. This descent of the piston $b$ will tend to raise the bucket C and immediately the weight of the bucket and its load is added to the resistance of whatever pressure is below the piston.

If the combined resistance of the pressure beneath the piston and the loaded bucket is more than the pressure above the piston it is obvious that the piston will stop before the bucket is lifted. Additional air will then be vented until the bucket is lifted and the valve $a^4$ is then closed. The piston will then continue its downward movement until the fluid pressure resistance below the piston, plus the gravity resistance of the loaded bucket, equals the actuation pressure above the piston, when a balance will be reached and the piston will be stopped in its descent.

A reading of the gauge G will now show what the fluid pressure is per square inch below the piston, which, in conjunction with the load resistance, is sufficient to balance the constant fluid pressure of 300 lbs. to the square inch above the piston, equal to 9000 lbs. I will assume that, in balance, the pressure gauge shows 200 lbs. to the square inch. It follows that the pressure below the piston is equal to 6000 lbs. to be deducted from 9000 lbs. pressure above the piston, the difference, 3000 lbs. being balancing resistance due to other causes than the fluid pressure resistance below the piston, namely the bucket and load, which aids the fluid pressure resistance and resists the piston actuating pressure. Subtraction of the tare factor of 1500 lbs. leaves a load weight of 1500 lbs.

The mechanism is reset by admitting compressed air by means of the two-way valve $a^4$, to re-establish the normal balancing pressure of 300 lbs. to the square inch below the piston, whereupon the loaded bucket will retract the piston to its highest position, ready for another operation.

In practice the gauge may be conveniently marked with the figure corresponding to any given pressure below the piston when the mechanism is in balance, as indicated in Figure 2. At 300 lbs. there is no effective force above the piston, the pressure below entirely neutralizing it. At 225 lbs. per square inch there is a resisting fluid pressure below the piston of 6750 lbs., being the product of 225 lbs. multiplied by the piston area, 30 square inches, leaving an effective lifting force above the piston of 2250 lbs. being the difference between the resisting fluid pressure of 6750 lbs. and the actuating fluid pressure of 9000 lbs. above the piston. If the load and tare is more than 2250 lbs. the piston will be unable to lift it. In the case supposed, a bucket and connections weighing 1500 lbs. and a load of 1500 lbs., the piston would be minus 750 lbs. of power to lift the gross load. The operative would therefore vent more air by means of valve $a^4$ until the piston picked up the load and moved to a balance. In use the operative will vent amply at the outset and the piston will then descend, pick up the load and continue its descent until the recompression of air beneath the piston brings about a balance. The reading of the pressure gauge G will give the correct weight equivalent. At 200 lbs. for example there is a resistance pressure of 6000 lbs. below the piston leaving an actuating pressure balance of 3000 lbs. effective for lifting, and deducting 1500 lbs. tare the gauge shows the load weight to be 1500. As another example, suppose the net load to be in fact 750 lbs. This added to 1500 lbs. tare, for bucket and connections would equal 2250 lbs. gross load. Deducting this from 9000 lbs. the normal resisting force beneath the piston would leave 6750 lbs. necessary, in combination with the gross load, to balance the actuating force of 9000 lbs. above the piston. This necessary 6750 lbs. of resisting force beneath the piston, would be achieved when the air beneath the piston was recompressed to 225 lbs. to the square inch.

It will be understood of course that the outer circle, showing the weight of the load, is the only matter of real importance, outside the actual pressure per square inch, the outer circle showing the end of the computation. The inner circle shows the pressure per square inch in the cylinder. The next circle the total resisting force below the piston. The next circle the net actuating or lifting force above the piston, being the difference between the gross of 9000 lbs. and the total resisting force. The outer circle shows the weight of the load, after the tare of 1500 lbs. has been subtracted from the net actuating or lifting force. In practical use the operator as described above, opens the vent until the load is picked up by the piston. The vent is then closed and the piston will continue to travel down until a balance is attained by the recompression of the air beneath the piston, when the gauge G may be read.

The gauge H is desirable as a tell-tale, to show constantly the maintenance of the constant pressure of 300 lbs. to the square inch above the piston, $b$. The functioning of the apparatus in its preferred form is predicated upon this constant pressure, and it is therefore desirable to provide means for constantly checking this pressure requirement.

It will be observed that the pressure in tank A is designed to be considerably greater than the working pressure above the piston. The object is to assure always the predetermined pressure above the piston, which is controlled by the reduction valve. In my description and claims I have used the word cylinder as descriptive of the part in which the piston operates. It is of course obvious that the form of the part, whether it be strictly cylindrical or of other form is not material and the use of the word cylinder is not to be taken as a limitation. I have also used the relative words "upper" and "lower" end of the cylinder, in description. These are also to be taken as intended to cover any reversal of position, which may obviously be easily effected.

In the application of my invention to one use I have shown in Figure 3 the mast and boom of a derrick. In that figure 1 is the mast and 2 the boom. Upon a suitable platform is mounted a drum, 3, for hoisting the load, C, through a rope $3^a$. Another drum 4 controls the elevation of the boom through a rope $4^a$. The rope $3^a$ runs over a pulley $3^b$ carried at the lower end of a frame 3ᶜ which normally hangs upon a pintle 3ᵈ at the upper end of boom 2, upon which pintle is also mounted pulley 2ᵃ. From an ear 3ᵉ is led, over pulleys 2ᵃ and $p$, a rope $r$ to the upper end of the piston rod $b'$. The operation is as follows: The load is lifted a certain distance by drum 3, and stopped for the weight determination. The weighing mechanism Bᵇ is then operated, the descent of piston $b$, through rope $r$ lifting frame 3ᶜ so that it is no longer supported by the pintle 3ᵈ, but the weight is shifted to the rope $r$ and piston $p$. The weight is then read on the gauge G and the weighing mechanism reset by admitting air to the lower end of cylinder B, the load drawing the frame 3ᶜ down and the piston $b$ up as the normal balance is restored in the cylinder B. The load again rests upon pintle 3ᵈ and rope $r$ slackens. The load is then lifted and swung on boom 2 to shift and deliver it as required.

I claim:

1. In a weighing apparatus a cylinder a piston within said cylinder; means to cause a balanced fluid pressure to exist on both sides of the piston; means to connect the piston with a load; means to break the balanced pressure to lift the load; means to determine the pressure in both ends of the cylinder when the load is sustained by the piston.

2. In a weighing apparatus, the combination of a source of constant predetermined fluid pressure; a cylinder and piston; a connection for the fluid pressure to both ends of the cylinder above and below the piston; means to close the lower end of the cylinder to the fluid pressure; means to partially vent the lower end of the cylinder, all combined and operating substantially as described.

3. In a weighing apparatus, the combination of a source of constant predetermined fluid pressure; a cylinder and piston; a connection for the fluid pressure to the upper end of the cylinder above the piston; a reduction valve located in this connection; a second connection for the fluid pressure, from the first connection; between the reduction valve and the cylinder, to the lower end of the cylinder below the piston; means to close the lower end of the cylinder to the fluid pressure; means to partially vent the lower end of the cylinder; all combined and operating substantially as described.

4. In a weighing apparatus, the combination of a source of constant predetermined fluid pressure; a cylinder and piston; a connection for the fluid pressure to both ends of the cylinder above and below the piston; means to close the lower end of the cylinder to the fluid pressure; means to partially vent the lower end of the cylinder; a pressure gauge connected to the lower end of the cylinder.

Signed at Boston, Mass., this 26th day of October, 1920.

ALFRED S. SAMUELS.